US007711058B2

(12) United States Patent
Legouable et al.

(10) Patent No.: US 7,711,058 B2
(45) Date of Patent: May 4, 2010

(54) DETERMINATION OF THE TIME DELAY AND/OR POWER OF A MULTICARRIER SIGNAL

(75) Inventors: Rodolphe Legouable, Cesson-Sevigne (FR); Denis Callonnec, Rennes (FR); Maryline Helard, Rennes (FR)

(73) Assignee: France Telecom, Paris (FR)

(*) Notice: Subject to any disclaimer, the term of this patent is extended or adjusted under 35 U.S.C. 154(b) by 790 days.

(21) Appl. No.: 10/516,034

(22) PCT Filed: May 27, 2003

(86) PCT No.: PCT/FR03/01603

§ 371 (c)(1), (2), (4) Date: Jun. 10, 2005

(87) PCT Pub. No.: WO03/101015

PCT Pub. Date: Dec. 4, 2003

(65) Prior Publication Data

US 2005/0243937 A1 Nov. 3, 2005

(30) Foreign Application Priority Data

May 28, 2002 (FR) .................................. 02 06524

(51) Int. Cl.
*H04K 1/10* (2006.01)

(52) U.S. Cl. ....................... 375/260; 375/347; 375/349; 375/371; 370/210; 370/204

(58) Field of Classification Search ................. 375/260, 375/219, 354, 316
See application file for complete search history.

(56) References Cited

U.S. PATENT DOCUMENTS

| | | | | |
|---|---|---|---|---|
| 5,933,421 | A * | 8/1999 | Alamouti et al. | 370/330 |
| 5,946,292 | A * | 8/1999 | Tsujishita et al. | 370/204 |
| 6,038,275 | A | 3/2000 | Taura | |
| 6,332,069 | B1 * | 12/2001 | Zhao et al. | 455/12.1 |
| 6,434,205 | B1 | 8/2002 | Taura | |
| 6,501,414 | B2 * | 12/2002 | Arndt et al. | 342/22 |
| 6,654,408 | B1 * | 11/2003 | Kadous et al. | 375/148 |
| 6,654,429 | B1 * | 11/2003 | Li | 375/316 |
| 6,853,616 | B1 | 2/2005 | Kim | |
| 7,072,315 | B1 * | 7/2006 | Liu et al. | 370/329 |
| 2003/0081695 | A1 * | 5/2003 | Eilts et al. | 375/316 |

OTHER PUBLICATIONS

Le Gouable, R., et al., "Performance of single and muli-user detection techniques for a MC-CDMA system over channel model used for HIPERLAN2," IEEE 6th Int. Symp. on Spread-Spectrum Tech & Appl., Sep. 6-8, 2000.

* cited by examiner

*Primary Examiner*—Shuwang Liu
*Assistant Examiner*—Lihong Yu
(74) *Attorney, Agent, or Firm*—Oliff & Berridge, PLC

(57) ABSTRACT

The invention relates to a method of determining the time shift and/or the power of a received signal incorporating a reference sequence (3) and transmitted by multicarrier modulation on a set (M) of carriers spaced from each other by a distance nΔf where n is a natural integer and Δf is a constant. An inverse Fourier transform is applied to the phase variations between components of the signal carried by carriers separated by kΔf for consecutive values of k in order to obtain the impulse response (RI) of the signal and the time shift τ0 and/or the power of the received signal is/are determined from the impulse response by observation of the highest level amplitude peak.

12 Claims, 3 Drawing Sheets

DETERMINATION OF THE TIME DELAY AND/OR POWER OF A MULTICARRIER SIGNAL

FIELD OF THE INVENTION

The present invention relates to a method of determining the time shift and/or the power of a received signal transmitted between one or more user terminals and a base station or between a base station and one or more user terminals.

The invention also relates to a receiver circuit for implementing the method and to a receiver device.

DESCRIPTION OF THE RELATED ART

The invention applies to the field of transmitting signals by multicarrier orthogonal frequency division multiplex (OFDM) modulation combined with the multicarrier code division multiple access (MC-CDMA) technique, with the orthogonal frequency division multiple access (OFDMA) technique, or with the time division multiple access (TDMA) technique.

In the signal transmission field, it is always necessary to synchronize received signals at the receiver in order to be able to process them.

Different time synchronization techniques have already been proposed in different contexts.

In particular, the standards embodied in the ETSI documents "Radio Broadcasting Systems: Digital Audio Broadcasting (DAB) to mobile, portable and fixed receivers" (April 2000, reference En 300 401 V1.3.1) and "Digital Video Broadcasting (DVB); Framing structure, channel coding and modulation for digital terrestrial television" (July 1999, reference EN 300 744 V1.2.1) propose relatively complex time modulation techniques.

In the particular context of the DVB-RCT standard, which relates to terrestrial interactive digital television, it is particularly important to use a synchronization method that does not require too much computation power of the digital signal processing means because expansion of the terrestrial network must not be impeded by the cost of receivers.

In an OFDMA system, each user transmits a reference sequence on a set of carriers distributed at random, each carrier set being specific to one user. This is known in the art.

There is also a reference sequence in an MC-CDMA system, in which one or more users forming a user group transmit(s) on the same set of carriers, different users using different respective reference sequences, which in this context are referred to as "codes".

The invention is based on the existence of this kind of reference sequence in the signals transmitted and applies to any system for transmitting by multicarrier modulation signals that incorporate a reference sequence.

SUMMARY OF THE INVENTION

The present invention consists in a method of determining the time shift and/or the power of a received signal incorporating a reference sequence and transmitted by multicarrier modulation on a set of carriers spaced from each other by a distance $n\Delta f$ where n is a natural integer and $\Delta f$ is a constant, which method is characterized in that it consists in:

determining a phase variation representative of the phase variation between two components of the reference sequence of the received signal on two carriers separated by $k\Delta f$, where k is an integer, for at least two consecutive values of k, applying an inverse Fourier transform to the representative phase variations obtained in order to obtain the impulse response of the signal, and determining the time shift $\tau 0$ and/or the power of the received signal from the impulse response by observation of the highest level amplitude peak.

Thus the invention consists in searching the carriers conveying the signal for the phase variation that corresponds to the time shift of the signal.

The phase variations between the carriers are determined by differential demodulation and the phase variations determined in this way are related to families of carrier pairs, each family combining carrier pairs in which the two carriers are separated by the same integer multiple of a unit intercarrier offset $\Delta f$ between the carriers used.

Having reordered the phase variations obtained from increasing or decreasing but contiguous multiples of the unit intercarrier offset $\Delta f$, an inverse Fourier transform may be applied to obtain the impulse response of the signal and to deduce therefrom, merely from the amplitude peak supplied by the impulse response, either the time shift or the power of the received signal.

The method of the invention determines not only the time shift of the signal but also, by measuring the height of the resulting amplitude peak, it determines power information characteristic of the received signal.

In this way it is possible to control the power of users seeking to cohabit the same frequency band by applying feedback to their transmitters.

The effect of power control is that the receiver receives at the same power level the signals transmitted by all users. Power control therefore limits the problem of dazzle by preventing a user transmitting at a high power and therefore interfering strongly with signals transmitted by other users.

As will become apparent on reading the examples described below, the complexity of the method of the invention depends essentially on two parameters, namely the number Nfft of values of the integer k for which a representative phase variation is determined and the method of determining the representative phase variation for each value of k, given that there are several pairs of carriers spaced by the offset $k\Delta f$.

In one particular implementation of the invention, the representative phase variation for a value of k is determined by calculating the average of the phase variations of a plurality of pairs of components of the received reference sequence conveyed by carriers separated by $k\Delta f$.

In this case, the number of terms used to calculate the average is an important parameter that conditions the complexity of the method of the invention.

The method of the invention is easier to put into practice if the set of carriers used to transmit the signal enables pairs of carriers to be constituted in which the two carriers of a pair are separated by an offset $k\Delta f$ with k varying from 1 to Nfft.

In the context of the DVB-RCT standard, each set of carriers (also referred to as a "subchannel") usable by a group of users is made up of 145 carriers that can be grouped in pairs covering all values of k from 1 to 256.

If, of all the carriers of a subchannel, it is not possible to select two that are separated by the offset $k\Delta f$, the invention proposes either using the value zero as the representative phase variation for this value of k or else using the average of the representative phase variations obtained for the adjacent values of k.

This is the case in particular in the DVB-RCT standard for the following values of k between 1 and 512, for subchannel 0 of the 1K mode: 406, 435, 484 and 493.

In a different implementation of the method of the invention, for each value of the integer k, the phase variation between two components of the received signal carried by first and second carriers separated by kΔf is calculated first, after which the representative phase variation is calculated by multiplying the phase variation obtained by the product of the reference sequence component on the first carrier and the conjugate of the reference sequence component on the second carrier.

Apart from the fact that this implementation reduces the number of operations to be effected by omitting calculation of the average of the phase variations, it entails multiplication by a product known in advance and whose values may be prerecorded.

In a particularly advantageous variant of this implementation, applied to transmitting signals by using regularly distributed carriers, for each value of the integer k, the phase variation is calculated between a basic component of the signal received on a basic carrier, chosen as such from the carriers used, and a component obtained by time-delaying k times the basic component with an intercarrier spacing Δf.

In other words, account is taken of the fact that the carriers are regularly distributed in order to consider only the first k pairs of carriers formed by the basic carrier and the first k carriers of the spectrum.

In the case of regularly distributed carriers, there is no benefit in considering all the available carriers to determine the required consecutive spacings.

The invention also consists in a receiver circuit adapted to determine the time shift and/or the power of a received signal incorporating a reference sequence and transmitted by multicarrier modulation on a set of carriers spaced from each other by a distance nΔf where n is a natural integer and Δf is a constant, which circuit is characterized in that it comprises:

- means for determining a phase variation representative of the phase variation between two components of the reference sequence of the received signal on two carriers separated by kΔf, where k is an integer, for at least two consecutive values of k,
- means for applying an inverse Fourier transform to the representative phase variations obtained in order to obtain the impulse response of the signal, and
- means for determining the time shift and/or the power of the received signal from the impulse response by observation of the highest level amplitude peak.

The invention further consists in a signal receiver incorporating the means referred to hereinabove.

To facilitate an understanding of the invention, implementations of the invention are described below by way of illustrative and nonlimiting example.

The examples used to explain the invention come from the context of time synchronization and power control based on the MC-CDMA technique as used in the draft DVB-RCT standard for terrestrial interactive digital television.

The person skilled in the art will know how to identify the use that is made in these examples of the reference sequence (referred to herein as a code) and how to transpose the invention to other standards also employing a reference sequence.

DETAILED DESCRIPTION OF THE INVENTION

Figure 1:
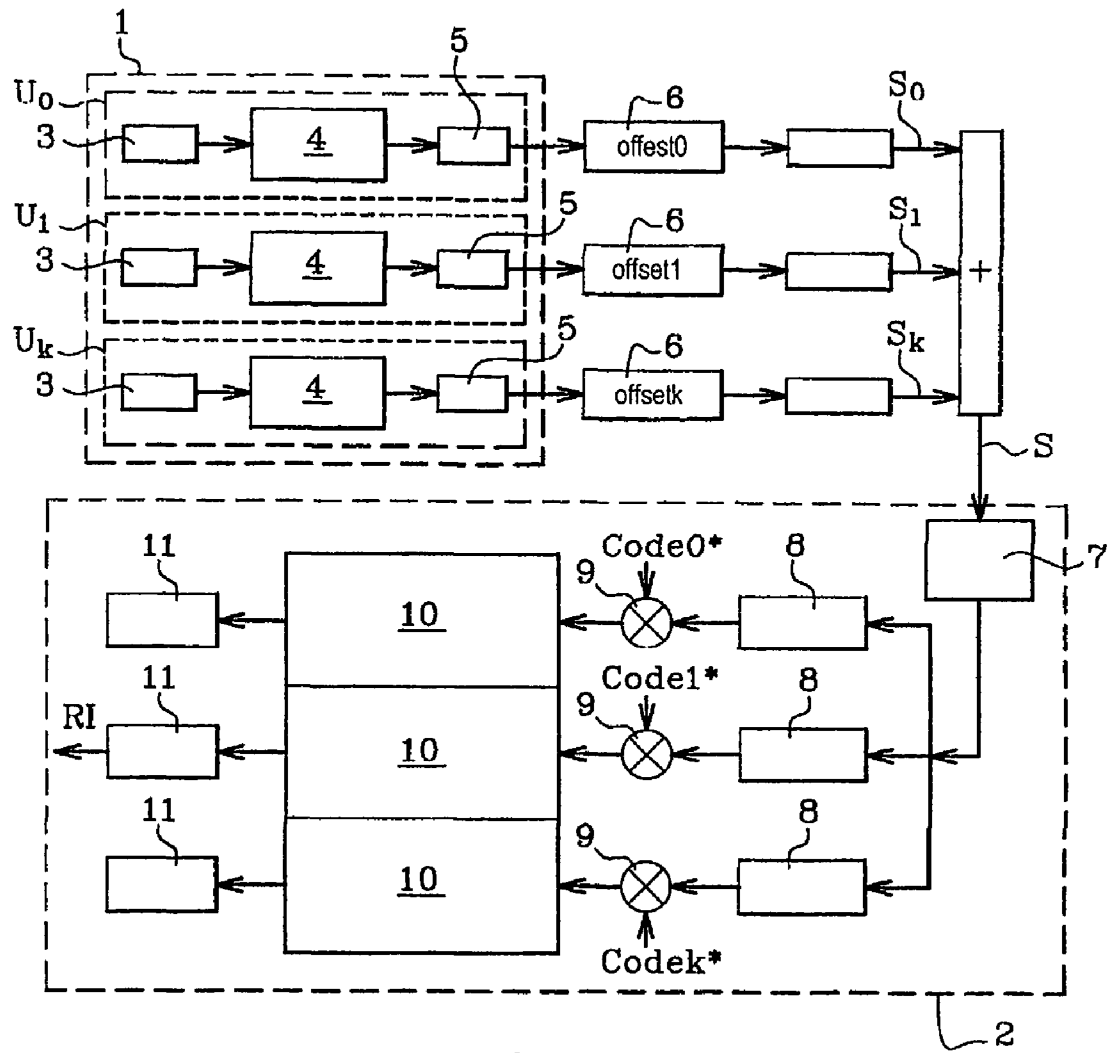
FIG. 1 is a block diagram of an MC-CDMA transmission system using an implementation of the method of the invention.

FIG. 1 is a block diagram of an uplink transmission system which comprises a group 1 of k+1 user terminals and a base station 2 that serves as a demodulator for retrieving the signals sent by each user from all of the received signals $S_0, \ldots, S_k$, which together constitute an overall received signal S.

In his terminal $U_0, \ldots, U_k$ each user sends a code 0, k referenced 3 that is specific to the terminal on a set M of subcarriers selected during a step 4.

FIG. 1 represents only the situation in which k+1 users send on all M carriers.

The k+1 users may send their own reference sequence referred to herein as a code, simultaneously on the same set M of carriers, whilst at the same time k'+1 other users (this group is not shown) may send simultaneously on another set M' of carriers.

Each set of carriers is called a subchannel. The first two subchannels of the 1K mode of the DVB-RCT standard are referred to below by way of example.

Subchannel 0:

8 10 13 14 24 37 42 43 51 53 66 72 75 80 82 95 104 109 111 112 124 133 134 138 141 151 162 163 167 170 176 180 191 192 199 205 209 221 223 228 234 238 250 252 258 263 267 281 287 289 292 309 310 316 318 335 338 339 345 347 348 364 367 374 376 377 392 393 396 405 406 411 422 423 426 436 441 451 452 457 465 470 472 480 486 499 501 506 509 515 527 528 530 535 544 556 559 563 564 573 585 588 592 593 604 614 621 622 633 637 643 648 650 662 666 671 677 679 691 695 698 700 706 720 724 727 729 735 736 753 756 758 764 765 768 785 787 794 797 798 814 823 826 827 837

Subchannel 1:

6 17 18 22 25 31 35 46 47 54 60 64 76 78 83 89 93 105 107 113 118 122 136 142 144 147 164 165 171 173 190 193 194 200 202 203 219 222 229 231 232 247 248 251 260 261 266 276 277 280 290 295 305 306 311 319 324 326 334 340 353 355 360 363 608 611 613 619 620 623 640 642 649 652 653 669 678 681 682 692 705 707 710 711 721 734 739 740 748 750 763 769 772 777 779 792 801 806 808 809 821 830 831 835 838

Each subchannel is made up of 145 carriers. The sets M and M' of subcarriers yield all the values of k from 1 to 256 (for k=1 to 512, four values of k must be determined by interpolation).

Figure 2:
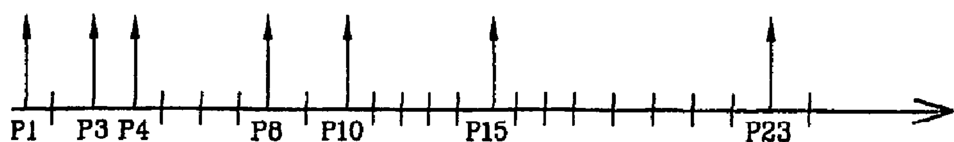
FIG. 2 shows seven carriers used to transmit a signal.

The explanation of the method of determining the time shift considers seven subcarriers P1, P3, P4, P8, P10, P15 and P23 of the OFDM spectrum, as shown in FIG. 2.

The signals to be sent are modulated by a modulator 5 using an inverse Fourier transform and then sent.

Since the various users send asynchronously to the base station, each user is received with a specific time shift, as schematized in 6.

If $x_j(t)$ is the signal sent by the user j on an OFDM symbol of duration Ts, in which the spectrum of the various carriers results from rectangular shaping filtering in the time domain, then the expression for $x_j(t)$ is:

$$xj(t) = \sum_{k \in M} \mathcal{Re}(C_{nk}^{j} \exp(2i\pi f k(t + \tau j))) \quad (1)$$

In equation (1), $C^j_{nk}$ corresponds to the chip of index $n_k$ (a chip is a fraction of the code sent) of the code of the user j modulating the carrier k (also referred to as a component of the reference sequence on the carrier k) and τj is the time-delay with which the signal from the user j reaches the base station.

In the base station 2, the global received signal is transposed into the frequency domain by a demodulator 7 using a direct Fourier transform.

The method of determining the time shift in the base station is explained below.

The following description considers only one user whose sent signal is shifted by τ0.

The received signal y(t) corresponds to the signal as sent affected by a disturbance $H_k$ linked to attenuation and phase rotation introduced on each subcarrier by the channel.

The expression for the received signal y(t) is:

$$y(t) = \sum_{k \in M} \mathcal{Re}(HkC_{nk} \exp(2i\pi f k(t + \tau 0))) \quad (2)$$

After application of the Fourier transform during reception in step 7, the signal received on each of the subcarriers k has the value:

$$Y_k = H_k C_{nk} \exp(-2i\pi f_k \tau 0) \quad (3)$$

The carriers of the set M are extracted by a unit 8 after which a multiplier 9 effects the complex conjugate multiplication of the signal received on each subcarrier and the chip of the code specific to the user and known to the receiver, after which a differential demodulator 10 calculates a representative phase variation.

The determination of the representative phase variation relies on a differential frequency domain method that yields the average phase variation between different pairs of carriers from the set M separated by a distance kΔf with k=1, . . . , Nfft.

Δf corresponds to the intercarrier spacing, which is equal to $1/t_s$ where $t_s$ is the usable duration of the OFDM symbol.

Nfft corresponds to a parametrizable value that depends on the set M and on the envisaged complexity of the system.

Figure 3:
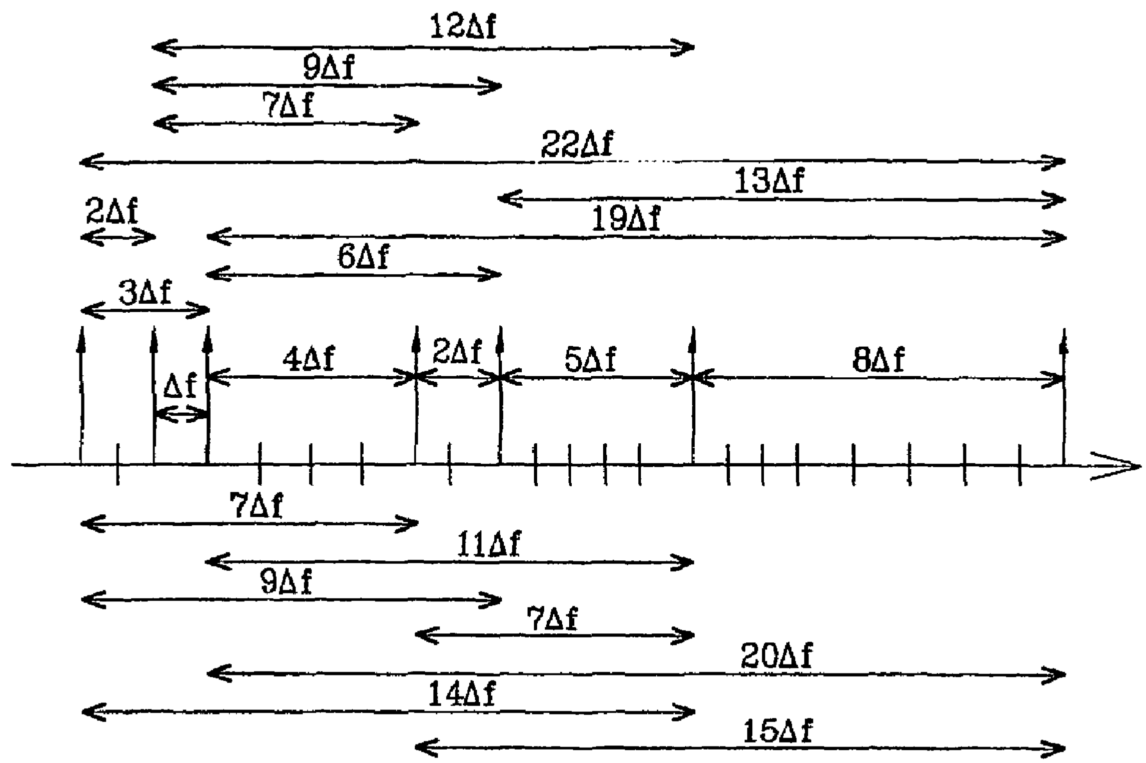
FIG. 3 is analogous to FIG. 2 and shows the offsets between carriers considered two by two.

FIG. 3 sets out all the carrier pairs corresponding to different values of k.

The phase variation between two signals separated by Δf is obtained by differentially demodulating the signal conveyed by the carrier P4 and the signal conveyed by the carrier P3.

The operation effected is to form the product P4.P3*, where P3* is the conjugate of P3.

In this way it is possible to determine all of the values relating to each value of k.

If there are more than one pair of carriers corresponding to the same value of k, then the average of the differential demodulations obtained for that value of k may be used.

In the FIG. 3 example, the offset 2Δf is obtained when considering the carrier pairs {P1, P3} and {P8, P10}. In this case, it is possible to average the differential demodulations, as follows:

$$\frac{P3P1* + P10P8*}{2}$$

The object of this averaging is to obtain a better estimate of the phase variation between two carriers separated by kΔf, averaging the various forms of interference encountered (propagation channel fluctuations, multiple access interference, noise, etc.). This value is taken as the representative phase variation for the value k.

If the set M of carriers cannot provide all the required values of k, it is possible either to consider that the differential modulation value corresponding to this value of k is zero or to carry out an interpolation operation by considering the indices of the values of k nearest the unlisted value of k for which a differential demodulation may be defined. The latter option gives better results.

By applying this differential demodulation to the first eight carrier indices of subchannel 0 of the 1K mode, the following set of values is obtained at the output of each differential demodulator 10:

$$\begin{aligned} &C3C_3^* H14\exp(-2i\pi f14\tau 0)(C2C_2^* H13\exp(-2i\pi f13\tau 0))* + \quad (4)\\ &C7C_7^* H43\exp(-2i\pi f43\tau 0)\\ &(C6C_6^* H42\exp(-2i\pi f42\tau 0))*;\ C1C_1^* H10\exp(-2i\pi f10\tau 0)\\ &(C0C_0^* H8\exp(-2i\pi f8\tau 0))*;\\ &C2C_2^* H13\exp(-2i\pi f13\tau 0)(C1C_1^* H10\exp(-2i\pi f10\tau 0))*;\\ &C3C_3^* H14\exp(-2i\pi f14\tau 0)\\ &(C1C_1^* H10\exp(-2i\pi f10\tau 0))*;\ C2C_2^* H13\exp(-2i\pi f13\tau 0)\\ &(C0C_0^* H8\exp(-2i\pi f8\tau 0))*; \end{aligned}$$

which yields the following set of values (in increasing order of kΔf):

$$\begin{aligned} &(H_{14}H_{13}^* + H_{43}H_{42}^*)\exp(-2i\pi\Delta f\tau 0);\\ &H_{10}H_8^*\exp(-4i\pi\Delta f\tau 0);\ H_{13}H_{10}^*\exp(-6i\pi\Delta f\tau 0);\\ &H_{14}H_{10}^*\exp(-8i\pi\Delta f\tau 0);\ H_{13}H_8^*\exp(-10i\pi\Delta f\tau 0); \quad (5) \end{aligned}$$

The set (5) of values may be generalized as follows:

$$\begin{aligned} &\sum_{\substack{k \in M\\ k-1 \in M}} HkHk - 1 * \exp(-2i\pi\Delta f\tau 0); \quad (6)\\ &\sum_{\substack{k \in M\\ k-2 \in M}} HkHk - 2 * \exp(-4i\pi\Delta f\tau 0);\ \ldots;\\ &\sum_{\substack{k \in M\\ k-Nff \in N}} HkHk - Nfft * \exp(-2 * Nfft * i\pi\Delta f\tau 0) \end{aligned}$$

What is required from all the terms of the expression (6) is to average the channel fluctuations over all the carriers separated by kΔf in order to obtain a better estimate of the impulse response of the propagation channel and therefore of the received propagation time-delay. It is therefore necessary to normalize each term by the number of sums constituting it:

$$\sum_{\substack{k\in M\\ k'\in M}} HkHk'^{*}$$

For a single-path channel (Hk=Hk'*=1), each term of the expression (4) becomes:

$$\sum_{k=1}^{Nfft} \exp(-2i\pi k\Delta f\tau 0) \tag{7}$$

A modulator 11 applies an inverse Fourier transform to the equation (7) to obtain the impulse response RI of the channel, yielding:

$$(7) \xrightarrow{\text{IFFT}} \delta(t-\tau 0) \tag{8}$$

This method yields a Dirac centered on τ0 relative to the time shift of the signal sent.

This determines the time shift.

It is seen that, quite apart from the performance achieved by the method of the invention, it is possible to vary its complexity.

The complexity of the method depends on the size of the inverse Fourier transform needed to obtain the impulse response of the channel and on the number of averaging points (Pt_avg) for each value of k used to determine the representative phase variation for each offset kΔf.

Equation (9) gives the number of complex multiplications the demodulator has to perform to implement the proposed method:

$$\underbrace{\frac{\text{Nfft\_glob}}{2}*\log 2\frac{\text{Nfft\_glob}}{2}}_{\text{global reception } FFT} + \underbrace{K*N}_{\text{multiplications by codes}} + \underbrace{K*Nfft*\text{pt\_avg}}_{\text{differential method}} + \underbrace{K*Nfft}_{\text{divisions for average}} + \underbrace{K*\frac{Nfft}{2}\log 2\frac{Nfft}{2}}_{\text{transposition to time domain by } IFFT} \tag{9}$$

In equation (9), Nfft_glob is the number of points of the Fourier transform in reception, K is the total number of possible code sequences, N is the size of the code sent, Nfft is the number of points over which the inverse Fourier transform is to be applied to determine the impulse response of each channel, and Pt_avg is the number of points used for averaging to obtain the representative phase variation for each value of kΔf for k=1, . . . , Nfft.

To obtain a good representation of the impulse response of the channel, it is necessary to vary the values of Nfft and Pt_avg allowing for the complexity that they generate.

The values taken by these two constants depend on the system parameters (number of carriers constituting the set M, values of the indices of the carriers of the set M, etc.) and must be adjusted according to the nature of the interference encountered (fluctuations of the propagation channel, multiple access interference, noise, etc.).

It is found that one factor contributing to the complexity of the method of the invention is the calculation of an average phase variation to obtain a representative phase variation for a given value of k.

The method may be simplified by not using any such average.

Figure 4:
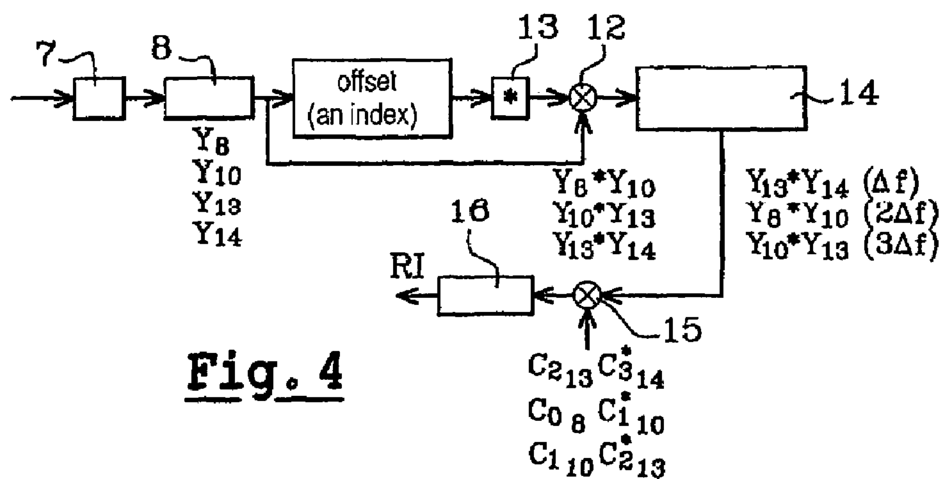
FIG. 4 is a block diagram of an MC-CDMA receiver system using a different implementation of the method of the invention.

Accordingly, as may be seen in FIG. 4, after application by the demodulator 7 of the direct Fourier transform in reception, the extractor 8 extracts all the carriers on which the code was sent (set M). FIG. 4 shows again, for the subcarriers, the indices of subchannel 0 of the mode 1K of the DVB-RCT standard.

The multiplier 12 applies the differential demodulation to the set M, taking the carriers in their order of extraction (two successive carriers being separated by kΔf for k=1, . . . , Nfft).

The operator 13 supplies to the multiplier 12 the conjugate of the carrier previously extracted for multiplication with the carrier being extracted.

Knowing the indices of the carriers of the set M that satisfy the kΔf offsets, the relative differential demodulation values are ordered in the memory 14 in increasing or decreasing order of k (one value for each value of k).

The multiplier 15 then multiplies each of the k values obtained by this differential demodulation by the term $C_{i,p} C_{j',p}{}^*$ (for i−i'=k) taken from a file specific to the set M and to the user.

At this stage the Nfft samples necessary for application by the modulator 16 of the inverse Fourier transform to obtain the impulse response RI of the propagation channel are available.

The time shift and the amplitude variation may be determined in order to adjust time synchronization and user power control.

In this case, the number of complex multiplications for a user is:

$$\underbrace{\frac{\text{Nfft\_glob}}{2}*\log 2\frac{\text{Nfft\_glob}}{2}}_{\text{global reception } FFT} + \underbrace{2*Nfft}_{\substack{\text{differential demodulation+}\\ \text{multiplication by } C_jC_{j+k}^*}} + \underbrace{\frac{Nfft}{2}\log 2\frac{Nfft}{2}}_{\text{transposition to time domain by } IFFT} \tag{10}$$

In equation (11) below, $N_{port\_}M$ corresponds to the number of carriers in the set M, which is naturally greater than the number of points of the inverse Fourier transform to be calculated.

The method may be further simplified if the reference sequences are sent on regularly distributed carriers. In this case, the intercarrier spacing is complied with and is by definition kΔf for the first Nfft carriers of the spectrum.

It is then possible to limit the calculation to the differential demodulation for the first Nfft pairs of carriers, rather than for all the pairs of carriers that may be formed for each value of k.

Figure 5:
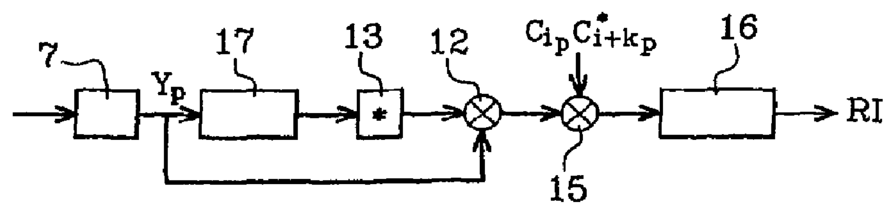
FIG. 5 is a block diagram of an MC-CDMA receiver system constituting a variant of the FIG. 4 system applied when the carriers conveying the reference sequence are regularly distributed.

Accordingly, as shown in the FIG. 5 block diagram, after application of the receive Fourier transform by the demodulator 7, the differential demodulation is effected by first choosing a basic carrier $Y_p$ (the first carrier of the spectrum, for example). This carrier is shifted k times (k=1, . . . , Nfft) at step 17 to effect Nfft differential demodulations by the multiplier 12 and the conjugation operation 13.

The multiplier 15 immediately multiplies each point obtained by differential demodulation by the term $C_{i,p}C_{i+k,p}{}^*$ calculated in advance and stored in a file ($C_{i,p}$ corresponds to the $i^{th}$ chip carried by the carrier p).

It is then possible for a unit 16 to apply the inverse Fourier transform over Nfft points, as before, to obtain the impulse response of the propagation channel and deduce therefrom the time shift and the amplitude variation that will be used for time synchronization and power control.

In this case, the number of complex multiplications for a user is:

$$\underbrace{\frac{\text{Nfft\_glob}}{2} * \log 2 \frac{\text{Nfft\_glob}}{2}}_{\text{global reception } FFT} + \underbrace{N_{\text{port\_M}} - 1}_{\text{differential demodulation}} + \underbrace{Nfft}_{\text{multiplication by } C_j C_j^*} + \underbrace{\frac{Nfft}{2} \log 2 \frac{Nfft}{2}}_{\text{transposition to time domain by } IFFT} \quad (11)$$

This is reflected in a very significant reduction in complexity.

Figure 6:
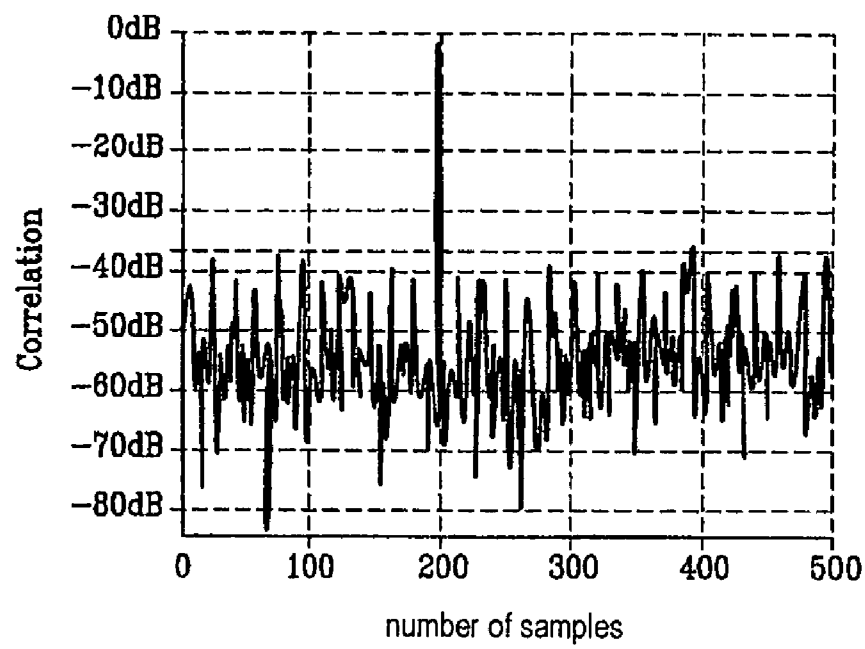
FIG. 6 is a graph of the impulse response obtained using the method of the invention and considering only one user.

FIG. 6 shows the impulse response obtained with the method of the invention by calculating an inverse Fourier transform over 512 points and considering the situation in which a single user transmits with a unit power and with a relative time-delay of $0.3847T_s$, where $T_s$ is the usable duration of the symbol, i.e. the reciprocal of the intercarrier spacing Δf.

This time-delay corresponds to 394 samples for an inverse Fourier transform covering 1024 points and to 197 samples for an inverse Fourier transform covering 512 points.

Note that the transmission shift and the receive power level are obtained.

The dynamic range, i.e. the difference between the highest amplitude peak and the secondary peaks, is 37 dB.

Figure 7:
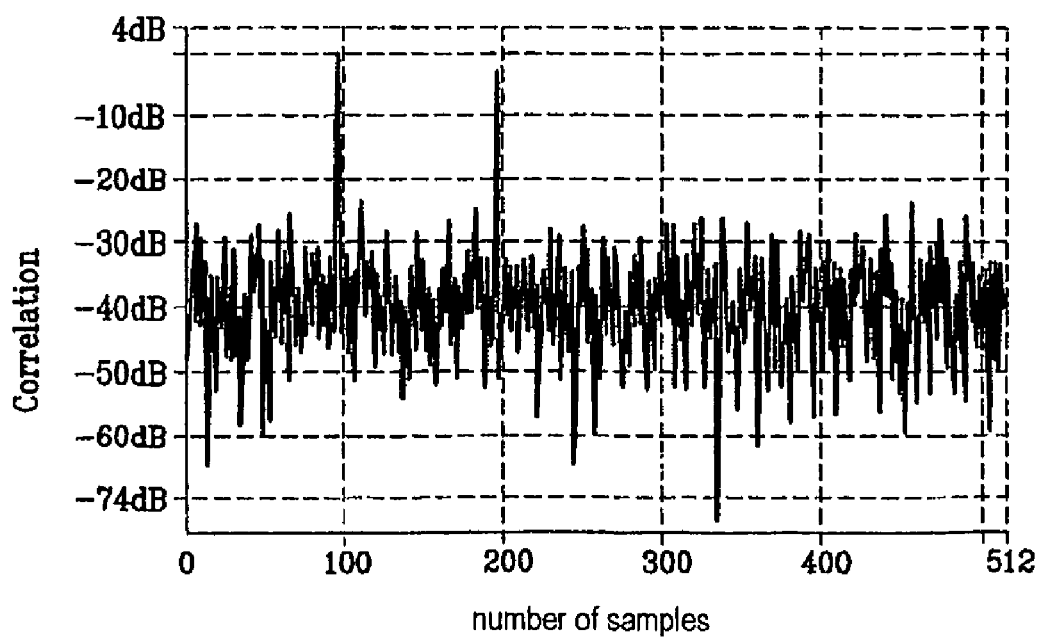
FIG. 7 is analogous to FIG. 6 but considers two users.

FIG. 7 shows the impulse response obtained in a situation where two users transmit simultaneously, the second user being received with a time-delay of $0.1835T_s$.

Of course, the implementations that have just been described do not limit the invention in any way and could be modified in any desirable manner without departing from the scope of the invention.

The invention claimed is:

1. A method of determining the time shift and/or power of a received signal incorporating a reference sequence and transmitted by multicarrier modulation on a set of carriers spaced from each other by a distance nΔf where n is a natural integer and Δf is a constant, wherein the method comprises:

determining, for each of at least two consecutive values of an integer k, a phase variation value associated with k and representative of the phase variation between two components of the reference sequence of the received signal on two carriers separated by kΔf by differentially demodulating the signal conveyed by one of the two carriers and the signal conveyed by the other of the two carriers, applying an inverse Fourier transform to a series formed by the phase variation values ranked as a function of the associated k in order to obtain the impulse response of the signal, and determining the time shift 0 and/or the power of the received signal from the impulse response by observation of the highest level amplitude peak.

2. A method according to claim 1, wherein at least one of the two components of the reference sequence of the received signal is obtained by multiplying a component of the signal received on a corresponding carrier by the conjugate of a component of the reference sequence on the corresponding carrier.

3. A method according to claim 2, wherein the representative phase variation for a value of k is determined by calculating the average of the phase variations of a plurality of pairs of components of the received reference sequence conveyed by carriers separated by kΔf.

4. A method according to claim 1, wherein, if there is no pair of carriers separated by kΔf, the value zero is taken as the phase variation for that value of k.

5. A method according to claim 1, wherein, if there is no pair of carriers separated by kΔf, the average of the representative phase variation obtained for the adjacent values of k is taken as the phase variation for that value of k.

6. A method according to claim 1, wherein, for each value of the integer k, the phase variation between two components of the received signal carried by first and second carriers separated by kΔf is calculated first, after which the representative phase variation is determined by multiplying the phase variation obtained by the product of the component of the reference sequence on the first carrier and the conjugate of the component of the reference sequence on the second carrier.

7. A method according to claim 6, wherein, for each value of the integer k, the phase variation between a basic component of the signal received on a basic carrier ($y_p$), chosen as such from the carriers used, and a component obtained by time-delaying k times the basic component with an intercarrier spacing Δf is calculated.

8. The method according to claim 1 applied in orthogonal frequency division multiplex (OFDM) multicarrier modulation in combination with multicarrier-code division multiple access (MC-CDMA) technique.

9. The method according to claim 1 applied in multicarrier orthogonal frequency division multiplex (OFDM) modulation in combination with frequency division multiple access (FDMA) technique.

10. The method according to claim 1 applied in multicarrier orthogonal frequency division multiplex (OFDM) modulation in combination with time division multiple access (TDMA) technique.

11. A receiver circuit adapted to determine the time shift and/or the power of a received signal incorporating a reference sequence and transmitted by multicarrier modulation on a set of carriers spaced from each other by a distance nΔf where n is a natural integer and Δf is a constant, wherein the circuit comprises:

means for determining, for each of at least two consecutive values of an integer k, a phase variation value associated with k and representative of the phase variation between two components of the reference sequence of the received signal on two carriers separated by kΔf by differentially demodulating the signal conveyed by one of the two carriers and the signal conveyed by the other of the two carriers, means for applying an inverse Fourier transform to a series formed by the phase variation values ranked as a function of the associated k in order to obtain the impulse response of the signal, and means for determining the time shift and/or the power of the received signal from the impulse response by observation of the highest level amplitude peak.

12. A receiver of signals of the type incorporating a reference sequence and transmitted by multicarrier modulation on a set of carriers spaced from each other by a distance nΔf where n is a natural integer and Δf is a constant, wherein the receiver comprises:

means for determining, for each of at least two consecutive values of an integer k, a phase variation value associated with k and representative of the phase variation between two components of the reference sequence of the received signal on two carriers separated by kΔf by differentially demodulating the signal conveyed by one of the two carriers and the signal conveyed by the other of the two carriers, means for applying an inverse Fourier transform to a series formed by the phase variation values ranked as a function of the associated k in order to obtain the impulse response of the signal, and means for determining the time shift and/or the power of the received signal from the impulse response by observation of the highest level amplitude peak.

* * * * *